US012214650B2

(12) United States Patent
Massari et al.

(10) Patent No.: US 12,214,650 B2
(45) Date of Patent: Feb. 4, 2025

(54) SYSTEMS FOR DRIVE AXLE

(71) Applicant: Dana Heavy Vehicle Systems Group, LLC, Maumee, OH (US)

(72) Inventors: Marcio Massari, Sorocaba (BR); Cassio Leme, Sorocaba (BR); Bruno Marocchio, Sorocaba (BR); Vinicius Ventura, Sorocaba (BR); Paula Nomura Watanabe, Sorocaba (BR)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 332 days.

(21) Appl. No.: 17/652,851

(22) Filed: Feb. 28, 2022

(65) Prior Publication Data

US 2022/0281302 A1    Sep. 8, 2022

Related U.S. Application Data

(60) Provisional application No. 63/157,578, filed on Mar. 5, 2021.

(51) Int. Cl.
| | | |
|---|---|---|
| *F16H 48/38* | (2012.01) | |
| *B60K 1/00* | (2006.01) | |
| *B60K 17/04* | (2006.01) | |
| *B60K 17/16* | (2006.01) | |

(52) U.S. Cl.
CPC .............. *B60K 1/00* (2013.01); *B60K 17/046* (2013.01); *B60K 17/16* (2013.01); *B60K 2001/001* (2013.01); *F16H 48/38* (2013.01)

(58) Field of Classification Search
CPC ...... B60K 17/16–165; B60K 2001/001; B60K 17/046; B60B 35/12; B60B 35/16–166; B60B 2310/316; B60B 2310/305; B62D 21/10; B62D 21/14; B62D 48/38–2048/426
See application file for complete search history.

(56) References Cited

U.S. PATENT DOCUMENTS

| | | | | |
|---|---|---|---|---|
| 2,153,287 | A * | 4/1939 | Wallace | B60B 35/16 29/463 |
| 4,468,981 | A * | 9/1984 | Ries | F16H 57/0434 180/370 |
| 7,984,782 | B2 * | 7/2011 | Platt | B60K 17/16 180/378 |
| 8,343,000 | B2 * | 1/2013 | Karlsson | B60L 15/20 180/65.6 |
| 8,439,150 | B1 * | 5/2013 | Mesa | B60K 17/24 180/359 |
| 8,464,611 | B1 * | 6/2013 | Chandler | B60K 17/165 74/607 |

(Continued)

FOREIGN PATENT DOCUMENTS

| | | | | |
|---|---|---|---|---|
| EP | 1679203 | A2 * | 7/2006 | .......... B60B 35/003 |
| KR | 102231658 | B1 * | 3/2021 | |

*Primary Examiner* — Ernesto A Suarez
*Assistant Examiner* — Lillian T Nguyen
(74) *Attorney, Agent, or Firm* — McCoy Russell LLP

(57) ABSTRACT

Methods and systems are provided for an electric drive axle. In one example, a tube is pressed into a portion of a differential housing, wherein a mount, a reinforcement ring, a wheel hub assembly, and a brake housing are physically coupled to the tube. The tube defines an axle path of an electric drive axle from an electric motor to a wheel.

19 Claims, 8 Drawing Sheets

(56) References Cited

U.S. PATENT DOCUMENTS

| | | | |
|---|---|---|---|
| 2007/0241609 A1* | 10/2007 | Seeds | B62D 7/18 301/132 |
| 2008/0295643 A1* | 12/2008 | Zalanca | B60B 35/006 74/607 |
| 2009/0082162 A1* | 3/2009 | Zink | B60K 17/16 475/230 |
| 2013/0281247 A1* | 10/2013 | Holmes | B60W 30/045 475/150 |
| 2017/0120676 A1* | 5/2017 | Chung | B60T 1/065 |
| 2019/0309821 A1* | 10/2019 | Manzoor | F16H 55/36 |
| 2020/0001708 A1* | 1/2020 | Willyard | F16D 3/2245 |

* cited by examiner

SYSTEMS FOR DRIVE AXLE

CROSS REFERENCE TO RELATED APPLICATION

The present application claims priority to U.S. Provisional Application No. 63/157,578, entitled "SYSTEMS FOR DRIVE AXLE", and filed on Mar. 5, 2021. The entire contents of the above-listed application are hereby incorporated by reference for all purposes.

TECHNICAL FIELD

The present description relates generally to an electric drive axle for an at least partially electric vehicle.

BACKGROUND AND SUMMARY

Concern over climate change is leading manufacturers to switch energy sources from fossil fuels to other energy sources, such as electricity. This includes a variety of transportation categories including vehicles, trucks, boats, motorcycles, airplanes, trains, and other transportation devices.

Previous examples of electric axle tracks and mount fixtures may be configured to be arranged in specific vehicle arrangements. Thus, proliferation of electric vehicles may be limited due to a design of the electric axle and/or the electric motor.

Previous developments of electric axle already in market have their track and mount fixtures configured to be arranged in one specific vehicle application. Thus, proliferation of different applications for electric vehicles may be limited due to a design of the electric axle and/or the electric motor.

In one example, the issues described above may be addressed by a system for a tube pressed into a portion of a differential housing, wherein a mount, a reinforcement ring, a wheel hub, and a brake housing are physically coupled to the tube. In this way, the tubes may be shaped at different lengths based on a vehicle arrangement.

The problem described above may be further addressed in a development of a system where, the original tubes of the previous example of the electric axle are removed and replaced by new tubes in the length according to the gauge to be met, pressed together with the electric motor housing with a new support of ring of reinforcement, where it joins by friction and welds the original motor housing to the new tubes developed for the system, in addition to adapting to the length with the use of new machined tubes, it is also possible to remove the original supports and use supports as a spring, stop and suspension damper applicable to the customer's chassis. In this way, the tubes may be shaped at different lengths based on a vehicle arrangement.

As one example, the tube may define an axle track of a motor axle along with an electric motor and a differential are arranged. A differential housing may include a first portion and a second portion arranged on opposite sides of the electric motor. The first and second portions may include independent planetary gear sets arranged therein. The tube may be separated into a first tube and a second tube separated by the electric motor and the differential.

As one example, the tube may define an axle track of a motor axle along with an electric motor and a differential are arranged. A differential housing may include a first portion and a second portion arranged on opposite sides of the electric motor. The first and second portions include independent reduction gears sets arranged therein. The tubes are separated into a first tube and a second tube where by one tube is mounted with a single reducer and a tube with a reducer and the planetary differential.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
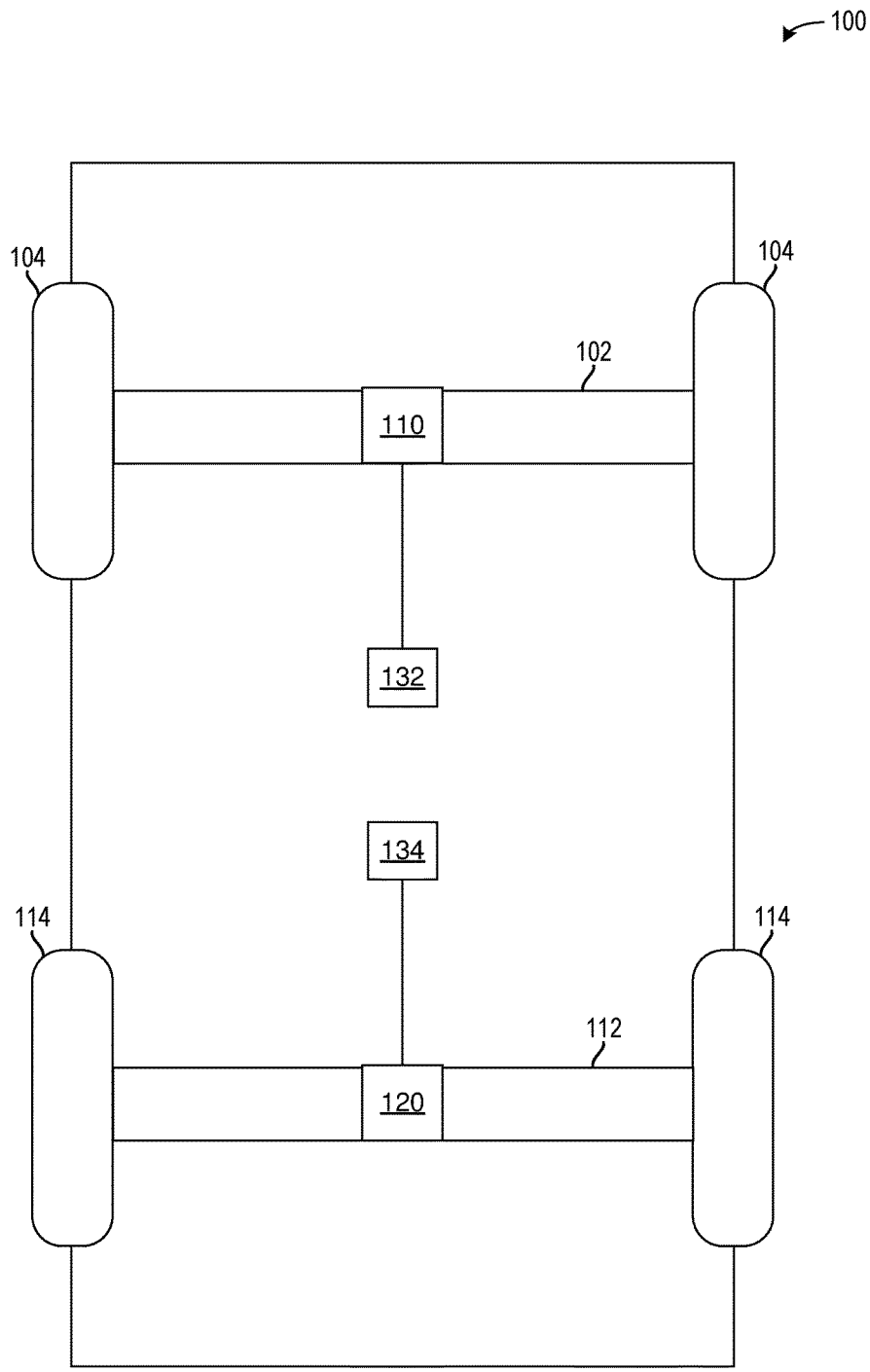
FIG. 1 shows a hybrid vehicle architecture.

The following description relates to a system for an electric motor. The electric motor may be included in a hybrid vehicles architecture as illustrated in FIG. 1. The electric motor may comprise a rotating axis that is concentric with a wheel axis. The electric motor may be coupled with a differential and a planetary reduction gear to transfer power to a wheel hub at a desired rotation speed. A planetary gear may be arranged at each side of the electric motor within a die casted position. The planetary gear may be further configured to couple the electric motor to a drive axle. The drive axle may extend to a differential of the electric motor linked directly to the planetary gears at a first side and through a concentric axle placed inside the electric motor at a second side, opposite the first side.

Tubes and/or a housing that define an axle track may be pressed into the casted part on each of the first and second sides. One or more of mounts, brackets, a wheel hub, and brakes may be fixed on the tubes and/or the housing to provide increased flexibility to adapt the electric motor system into different vehicle applications. Various views of the example electric motor system are illustrated in FIGS. 2-7. FIGS. 2-7 are shown approximately to scale. Alternative dimensions may be used if desired.

Turning now to FIG. 1, it shows a vehicle 100 comprising a first shaft 102 and a second shaft 112. The first shaft 102 may be configured to drive a first set of wheels 104 and the second shaft 112 may be configured to drive a second set of wheels 114. In one example, the first shaft 102 is arranged near a front of the vehicle 100 and the second shaft 112 is arranged near a rear of the vehicle 100.

A first electric motor 110 may be arranged on the first shaft 102 and a second electric motor 120 may be arranged on the second shaft 112. The first electric motor 110 may be configured to drive the first shaft 102, which may result in rotation of the first set of wheels 104. A first battery 132 may be configured to supply electrical energy to the first electric motor 110. The second electric motor 120 may be configured to drive the second shaft 112, which may result in rotation of the second set of wheels 114. A second battery 134 may be configured to supply electrical energy to the second electric motor 120. In some examples, additionally or alternatively, a single battery may be configured to supply electrical energy to each of the first electric motor 110 and the second electric motor 120.

The vehicle 100 is illustrated as an all-electric vehicle comprising one or more batteries for powering one or more electric motors to drive the vehicle. In one example, the vehicle 100 is an all-electric passenger vehicle. In some examples, additionally or alternatively, the vehicle 100 may be a hybrid vehicle including an engine configured to supply power to one or more of the first shaft 102 and the second shaft 112.

Figure 2:
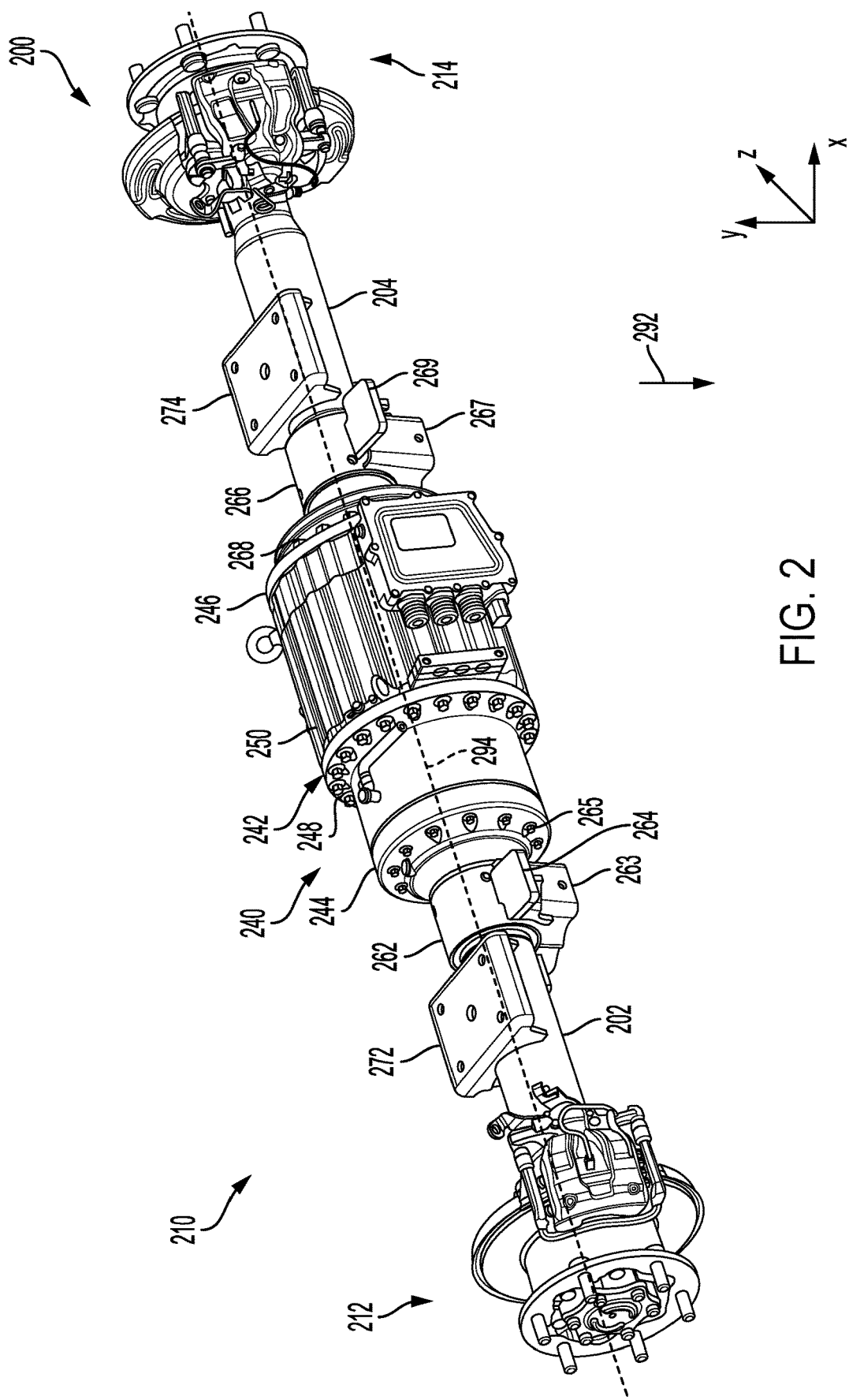
FIG. 2 shows a perspective view of an electric drive axle.
Figures 3A, 3B:
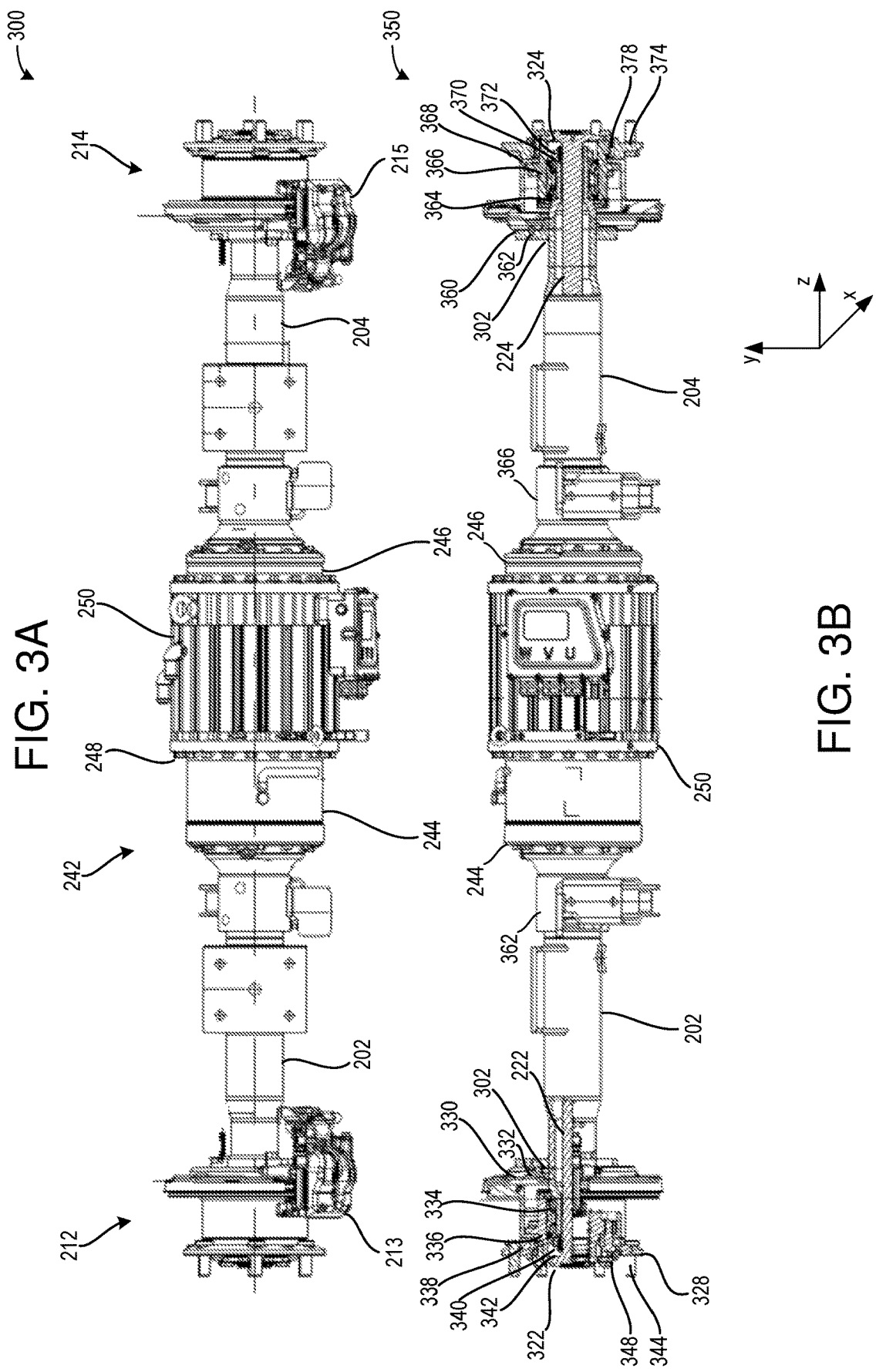
FIG. 3A shows a side-on view of the electric drive axle.
FIG. 3B shows a cross-sectional view of brake housings of the electric drive axle.
Figure 3C:
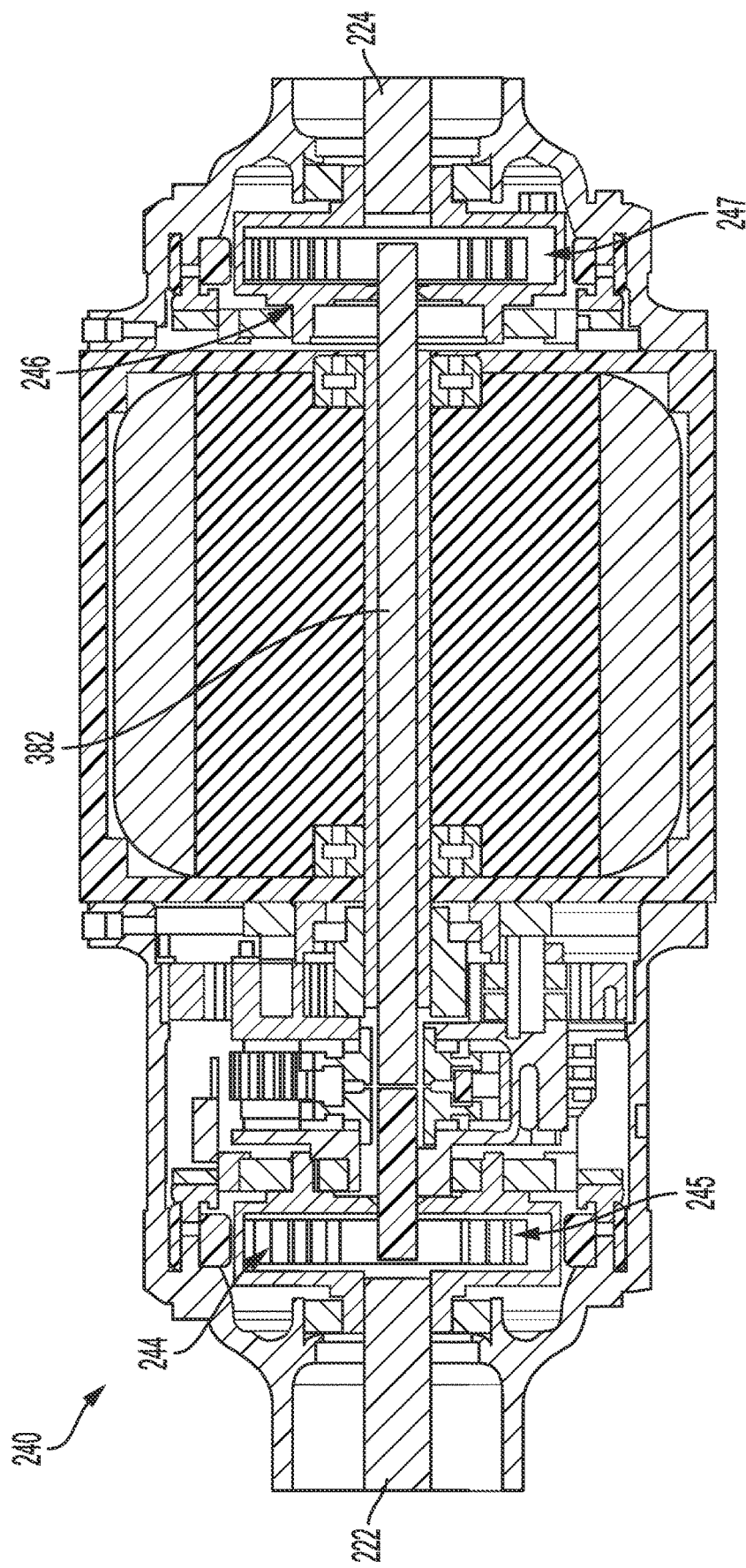
FIG. 3C shows a cross-sectional view of an electric motor and a differential housing.
Figure 4:
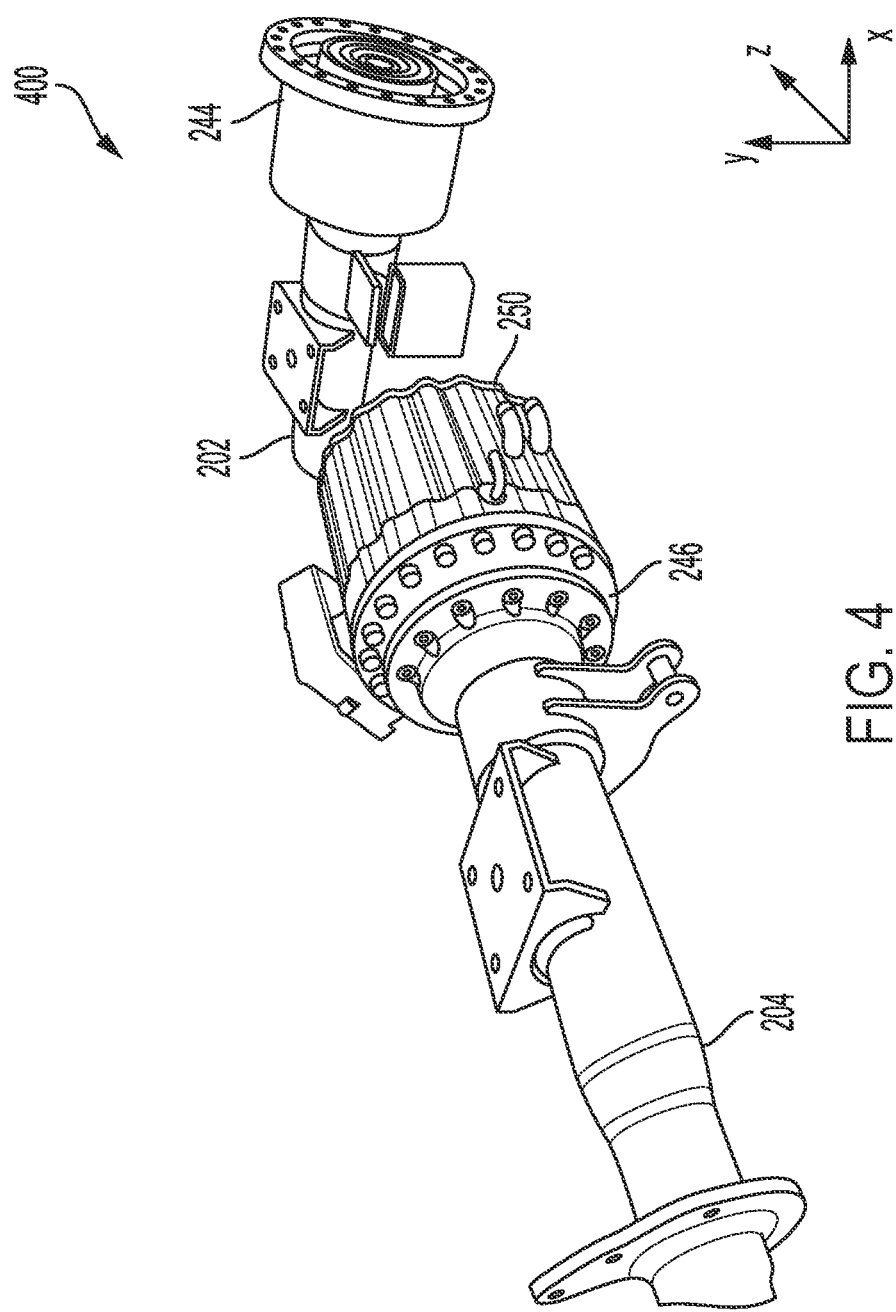
FIG. 4 shows a first portion and a second portion of the electric drive axle and the motor.
Figure 5:
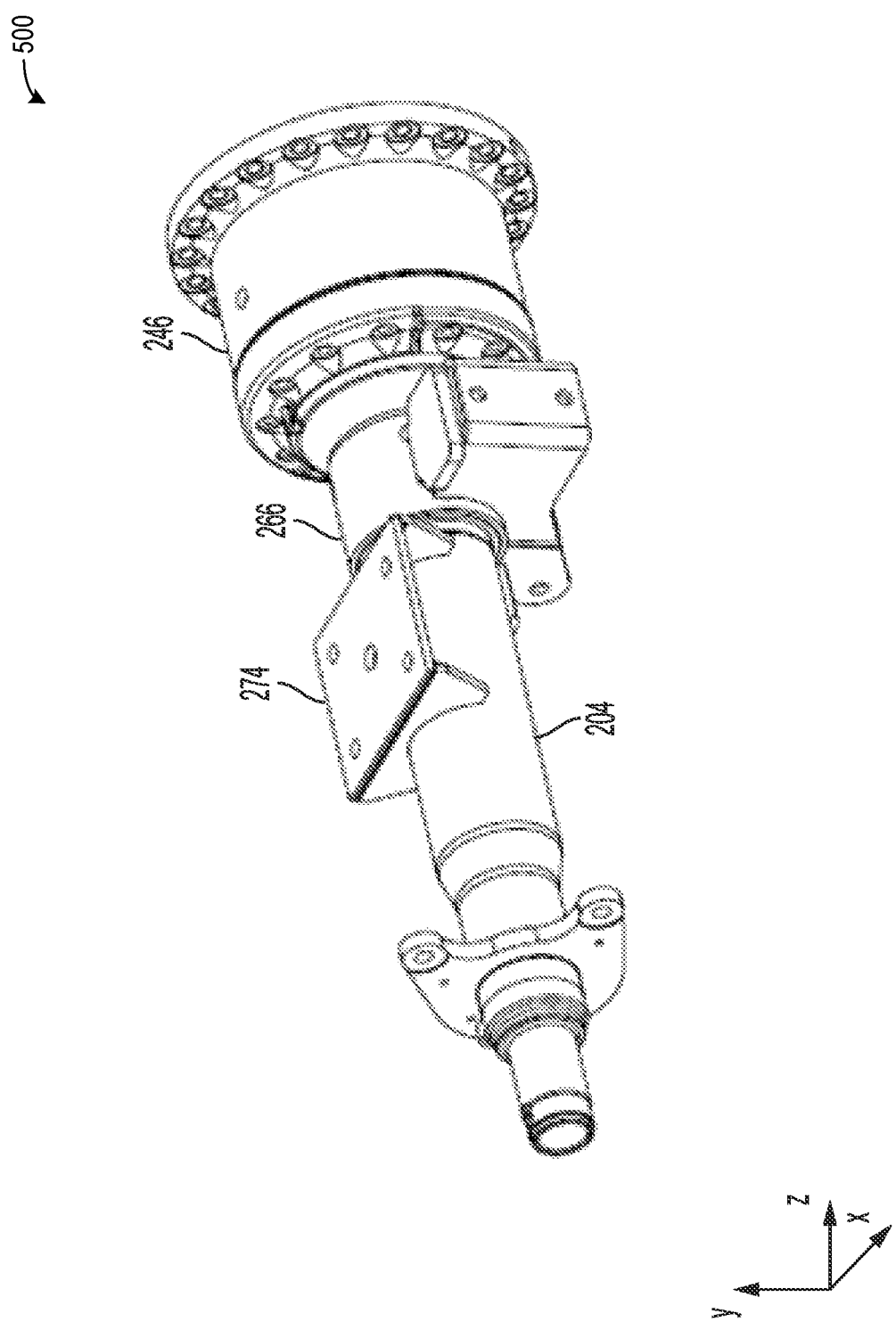
FIG. 5 shows the second portion of the electric drive axle.
Figure 6:
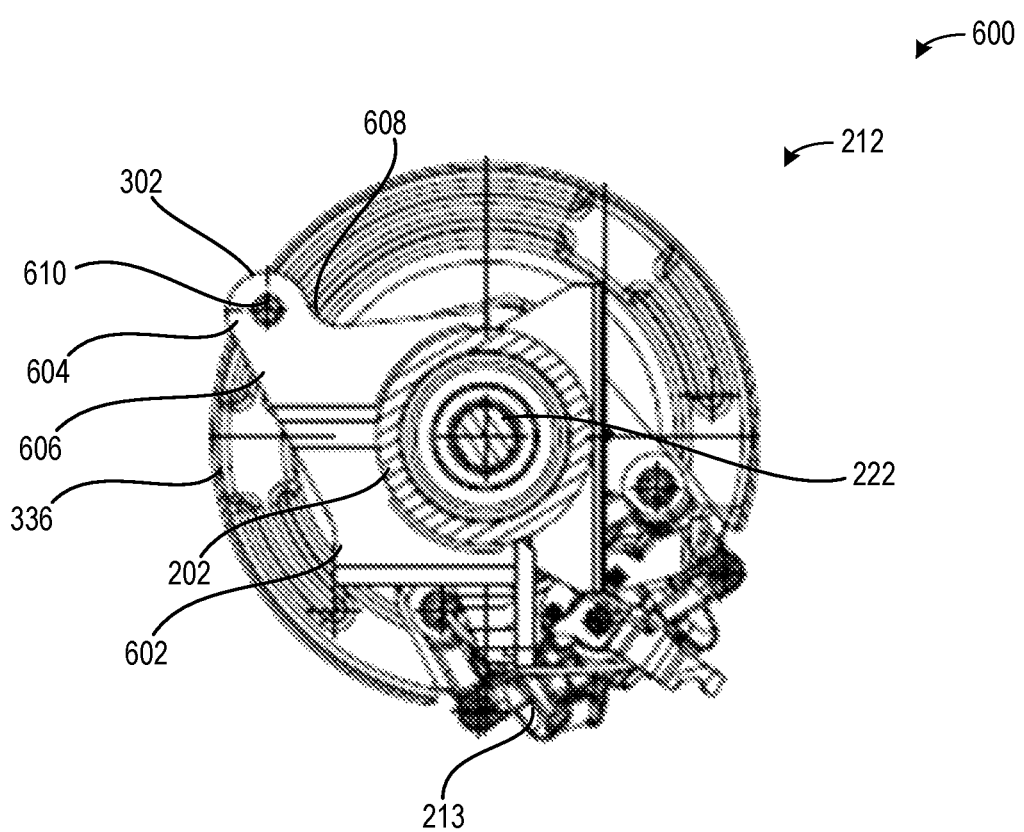
FIG. 6 shows a cross-section view of the second portion of the electric drive axle.
Figure 7:
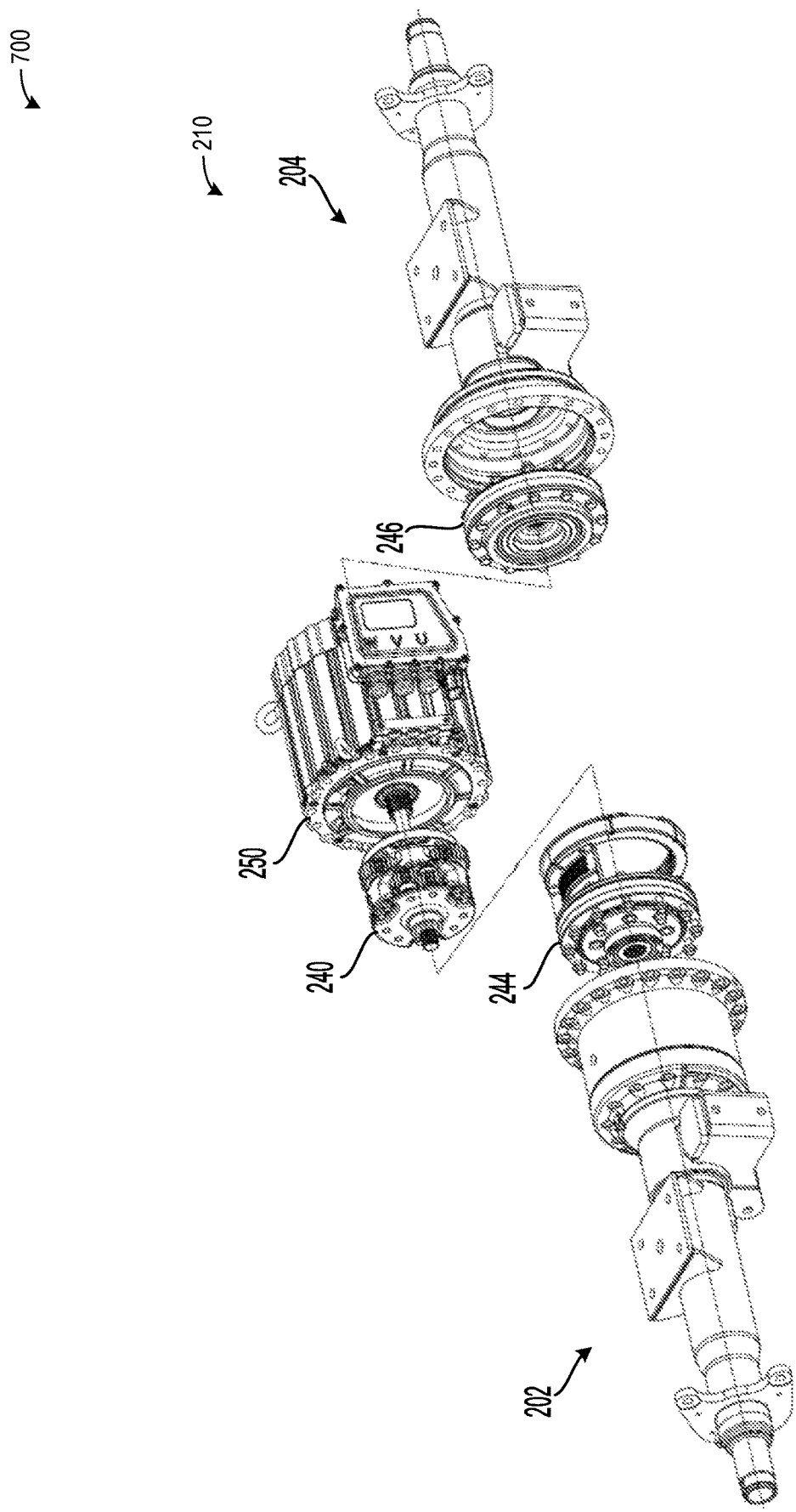
FIG. 7 shows an exploded view of the electric drive axle.

FIGS. 2-7 illustrate various views of a drive axle, or a portion thereof, comprising an electric motor with an easy to adjust tube that defines an axle track. That is to say, the configuration of the drive axle may be modified for various vehicle configurations and packaging sizes, thereby decreasing manufacturing difficulties. FIGS. 2-6 may be described in tandem herein. Specifically, FIG. 2 shows an embodiment 200 illustrating a perspective view of a drive axle 210. FIG. 3A shows a side-on view 300 of the drive axle 210 and FIG. 3B shows a cross-sectional view of the drive axle 210. FIG. 4 illustrates a further embodiment 400 of the drive axle 210. FIG. 5 illustrates another embodiment 500 of a second portion of the drive axle. FIG. 6 illustrates a view of the wheel hub and an interface of the drive axle. FIG. 7 illustrates an exploded view 700 of the embodiment 200 of the drive axle 210. As such, identical components may be identically numbered in FIGS. 2-7.

An axis system is shown comprising three axes, namely an x-axis parallel to a horizontal axis, a y-axis parallel to a vertical axis, and a z-axis parallel to a transverse axis and normal to each of the x- and y-axes. A direction of gravity is illustrated via an arrow 292 (herein, gravity 292). A central axis 294 of the drive axle 210 is arranged along an x-z plane.

The drive axle 210 may include an electric motor 250, which may be a non-limiting example of the electric motor 110 or the electric motor 120 of FIG. 1. As such, the drive axle 210 may be a non-limiting example of first shaft 102 or the second shaft 112 of FIG. 1. The electric motor 250 may be arranged centrally between a first wheel hub assembly 212 and a second wheel hub assembly 214. The first wheel hub assembly 212 and the second wheel hub assembly 214 may be configured to mount to the first set of wheels 104 and the second wheel set 114 of FIG. 1, respectively. In one example, the first wheel hub assembly 212 and the second wheel hub assembly 214 are arranged at opposite ends of the drive axle 210.

The electric motor 250 may be coupled to the drive axle 210 via a differential 240 and planetary reduction gears. The differential 240 is shown in greater detail in FIG. 7. The differential 240 and the planetary reduction gears may be configured to supply a desired rotational speed to wheels of each of the first wheel hub assembly 212 and the second wheel hub assembly 214.

The differential 240 may include a differential housing 242. The differential housing 242 may include a first portion 244 and a second portion 246. The differential housing may be die cast as two separate pieces, which include the first portion 244 and the second portion 246, arranged on opposite sides of the electric motor 250. In one example, the first portion 244 may be larger than the second portion 246.

Additionally or alternatively, in some examples, the first portion 244 and the second portion 246 may be equal in size. In one example, the differential 240 is arranged on a side of the electric motor 250 closer to the first wheel hub assembly 212. On an opposite side of the electric motor 250 closer to the second wheel hub assembly 212, there may be arranged another planetary gear set. That is to say, a first planetary gear set may be arranged at a first side of the electric motor 250 and a second planetary gear set may be arranged at a second side of the electric motor 250.

The first portion 244 of the differential housing 242 may be arranged on a side of the electric motor 250 biased toward the first wheel hub assembly 212. The second portion 246 of the differential housing 242 may be arranged on a side of the electric motor 250 biased toward the second wheel hub assembly 214. The first portion 244 and the second portion 246 may be physically coupled to the electric motor 250 via a plurality of fasteners 248. The plurality of fasteners 248 may include one or more of bolts, screws, lugs, or the like arranged around a circumference of each of the first portion 244 and the second portion 246.

The differential housing 242 may include a die cast of metal, including one or more of aluminum, steel, cast iron, or the like. In one example, the differential housing 242 may house the differential 240 and the planetary gears including a first planetary gear set 245 within the first portion 244 and a second planetary gear set 247 within the second portion 246, as shown in FIG. 3C.

A first drive axle portion 222 (shown in FIG. 3B) may extend to the differential 240, where the first drive axle portion 222 may be engaged with the first planetary gear set 245. The drive axle 210 may extend through the electric motor 250 via a concentric axle 382 shown in FIG. 3C. A second drive axle portion 224 may extend into the second portion 246 of the differential housing 242, wherein the second drive axle portion 224 may engage with the second planetary gear set 247. In this way, the first drive axle portion 222 may provide a first rotational speed to the first wheel hub assembly 212 and the second drive axle portion 224 may provide a second rotational speed, different or equal to the first rotational speed, to the second wheel hub assembly 214. In one example, the speeds may be differentiated via adjusting a gearing of the differential or of the planetary gear sets, which may provide torque vectoring or other all-wheel drive capabilities.

An axle track of the drive axle 210 may be defined via a first tube 202 and a second tube 204. The first tube 202 may be pressed into the first portion 244 of the differential housing 242. The second tube 204 may be pressed into the second portion 246 of the differential housing 242. That is to say, the first tube 202 may be arranged at least partially inside of and in face-sharing contact with interior surfaces of the first portion 244 of the differential housing 242. The second tube 204 may be pressed inside and in face-sharing contact with interior surfaces of the second portion 246 of the differential housing 242. The drive axle 210 may be concentric with each of the first tube 202 and the second tube 204 about the central axis 294.

The first drive axle portion 222 may be positioned to rotate within the first tube 202. The second drive axle portion 224 may be positioned to rotate within the second tube 204. In one example, based on a sizing of the first portion 244 and the second portion 246 of the differential housing 242, lengths of the first tube 202 and the second tube 204 may be different. In one example, the length of the first tube 202 may be less than the length of the second tube 204.

The first tube 202 and the second tube 204 may comprise a cylindrical shape. In one example, diameters of the first and second tubes 202, 204 may be substantially identical. Additionally or alternatively, diameters of the first tube and the second tube 202, 204 may be uniform along their lengths, measured along the central axis 294.

A first reinforcement ring 262 may be configured to support the first tube 202 coupling to the first portion 244 of the differential housing 242. The first reinforcement ring 262 may include a bracket 263 configured to couple to a portion of the first portion 244 of the differential housing 242. A plurality of fasteners 265 may physically couple the first reinforcement ring 262 to the first portion 244 of the differential housing 242. In one example, first reinforcement ring 262 comprises a trumpet or a megaphone shape. The trumpet shape may include where a first end of the ring includes a first diameter and a second end of the ring includes a second diameter, different than the first. A transition from the first diameter to the second diameter may be linear, logarithmic, exponential, or the like. The first reinforcement ring 262 may include a first diameter distal to the first portion 244 of the differential housing 242. The bracket 263 may be coupled to the first reinforcement ring 262 at its first diameter. The diameter of the first reinforcement ring 262 may increase from the first diameter to a second diameter, wherein the second diameter of the first reinforcement ring 262 may be equal to a diameter of the first portion 244 of the differential housing 242. The first tube 202 may extend through an opening of the first reinforcement ring 262 such that the first reinforcement ring 262 and the first tube 202 are concentric about the central axis 294.

A second reinforcement ring 266 may be configured to support the second tube 202 coupling to the second portion 246 of the differential housing 242. The second reinforcement ring 266 may include a bracket 267 fixedly coupled to a smaller diameter of the second reinforcement ring 266. A plurality of fasteners 268 may physically couple the second reinforcement ring 266 to the second portion 246 of the differential housing 242. In one example, second reinforcement ring 266 comprises a trumpet or a megaphone shape, similar to the first reinforcement ring 262. The smaller diameter of the second reinforcement ring 266 may be distal to the second portion 246. The bracket 267 may be coupled to the second reinforcement ring 266 at its smaller diameter. The diameter of the second reinforcement ring 266 may increase from the smaller diameter to a largest diameter, wherein the largest diameter of the second reinforcement ring 266 may be equal to a diameter of the second portion 246 of the differential housing 242. The second tube 204 may extend through an opening of the second reinforcement ring 266 such that the second reinforcement ring 266 and the second tube 204 are concentric about the central axis 294. In one example, the smaller diameter of the second reinforcement ring 266 is equal to the first diameter of the first reinforcement ring 262 and the largest diameter of the second reinforcement ring 266 is equal to the second diameter of the first reinforcement ring 262. Each of the first reinforcement ring 262 and the second reinforcement ring 266 may include respective dampeners 264, 269.

A first mount 272 may be arranged on the first tube 202 between the first reinforcement ring 262 and the first wheel hub assembly 212. A second mount 274 may be arranged on the second tube 204 between the second reinforcement ring 266 and the second wheel hub assembly 214. In one example, the first mount 272 is adjacent to the first reinforcement ring 262 and the second mount 274 is adjacent to the second reinforcement ring 266. The first mount 272 and the second mount 274 may be configured to physically couple to mounts on an underside of a vehicle. In one example, a plurality of fasteners, which may include bolts, screws, lugs, or the like, may extend into through through-holes 273 and 275 of the first and second mounts 272, 274, respectively, and extend into through-holes arranged on the underside of the vehicle.

The first mount 272 and the second mount 274 may include a square shape, wherein through-holes thereof may be arranged proximally to corners of the square. The first mount 272 may interface to the first tube 202 via a C-shaped interface and the second mount 274 may interface to the second tube 204 via a C-shaped interface. The C-shape interfaces may extend around a portion of a circumference of the first tube 202 and the second tube 204.

The first tube 202 may be further physically coupled to each of the first wheel hub assembly 212 and a first brake housing 213. In one example, the first brake housing 213 may be a disc brake housing. Turning to FIG. 3B, it shows a detailed view 350 of the first wheel hub assembly 212 and the second wheel hub assembly 214. The first wheel hub assembly 212 and the second wheel hub assembly 214 may be substantially identical in size and configuration.

The first wheel hub assembly 212 may include a first plate backing 330, a plurality of fasteners 332, an O-ring 334, a hub body 336, a disc brake 338, a washer 340, a nut 342, an adapter 344, and a plurality of bolts and washers 348.

The first plate backing 330 may be physically coupled to the first tube 202 via the plurality of fasteners 332. The plurality of fasteners 332 may extend in a direction parallel to the central axis 294 and away from the electric motor 250. In one example, the first tube 202 may include an interfacing plate 302 with a diameter substantially equal to a diameter of the first plate backing 330, wherein the diameter of the interfacing plate 302 may be larger than the first diameter of the first tube 202.

The O-ring 334 may be arranged interior to the hub body 336 and around a body of the first drive axle portion 222. The disc brake 338 may be arranged radially outside of the hub body 336, such that the first drive axle portion, the hub body 336, and the disc brake 338 are concentric with one another relative to the central axis 294. The washer 340, the nut 342, and the adapter 344 may be configured to physically couple a rotor 328 of the first wheel hub assembly 212 to the hub body 336. In one example, the adapter 344 may be a hub stud.

The first drive axle portion 222 extending into the first wheel hub assembly 212 comprises a flanged portion 322. The flanged portion 322 may extend radially outward from the first drive axle portion 222 in a direction normal to the central axis 294. The flanged portion 322 may interface with an inner bearing or other rotatable feature of the first wheel hub assembly 212. In one example, the flanged portion 322 is pressed against the rotor 328 via the plurality of bolts and washers 348.

The second wheel hub assembly 214 may include a first plate backing 360, a plurality of fasteners 362, an O-ring 364, a hub body 366, a disc brake 368, a washer 370, a nut 372, an adapter 374, and a plurality of bolts and washers 378. The second wheel hub assembly 214 may be arranged identically to the first wheel hub assembly 212 described above.

The second drive axle portion 224 extending into the first wheel hub assembly 212 comprises a flanged portion 324. The flanged portion 324 may extend radially outward from the second drive axle portion 224 in a direction normal to the central axis 294. The flanged portion 324 may interface with an inner bearing or other rotatable feature of the second wheel hub assembly 214. In one example, the flanged portion 324 is pressed against the rotor 328 via the plurality of bolts and washers 348.

In this way, first tube 202 may be fixedly coupled to each of the first mount 272, the first wheel hub assembly 212, the first brake housing 213, and the first reinforcement ring 262. Likewise, the second tube 204 may be further physically coupled to each of the second wheel hub assembly 214 and a second brake housing 215. In this way, the second tube 204 may be fixedly coupled to each of the second mount 274, the second wheel hub assembly 214, the second brake housing 215, and the second reinforcement ring 266.

Turning to FIG. 6, it shows an alternative embodiment 600 of the interfacing plates 302, 304. In the example of FIG. 6, the interfacing plate 302 comprises a circular body 602 with an arm 604 extending therefrom. The circular body 602 may be concentric with the first drive axle portion 622. The arm 604 may extend radially outward away from the circular body 602 at a location distal to the first brake housing 213. The arm 604 may comprise a curved, half-circle shape with a long side 606 and a short, curved side 608. A through-hole 610 is arranged on the arm 604, wherein a fastener or other coupling device may extend through the through-hole 610 to physically couple the interface plate 302 to a portion of the first wheel hub assembly.

By shaping the first tube 202 and the second tube 204 in this way, lengths of the tubes may vary to accommodate different vehicle axle lengths and configurations. The mounts physically coupled to the tubes may be arranged along different positions of the tubes to correspond with undermount locations of an underbody of a vehicle. The brakes of the vehicle may be modified without a new die casting mold, which may save time and reduce expenses.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing The disclosure also provides support for a system including a tube pressed into a portion of a differential housing, wherein a mount, a reinforcement ring, a wheel hub assembly, and a brake housing are physically coupled to the tube. In a first example of the system, the tube and the differential housing are arranged on an electric drive axle comprising an electric motor. In a second example of the system, optionally including the first example, the portion of the differential housing is a first portion arranged on a first side of the electric motor, the differential housing further comprising a second portion arranged on a second side of the electric motor opposite the first side. In a third example of the system, optionally including one or both of the first and second examples, the tube is a first tube, and where the first tube is pressed into the first portion of the differential housing, further comprising a second tube pressed into the second portion of the differential housing. In a fourth example of the system, optionally including one or more or each of the first through third examples, the first tube and the second tube are different in length. In a fifth example of the system, optionally including one or more or each of the first through fourth examples, the electric drive axle is concentric with the first tube and the second tube about a central axis.

The disclosure also provides support for a system for an electric drive axle, comprising: a differential housing comprising a first portion arranged on a first side of an electric motor and a second portion arranged on a second side of the electric motor, a first planetary gear set arranged in the first portion and a second planetary gear set arranged in the second portion, a first tube pressed into the first portion of the differential housing, and a second tube pressed into the second portion of the differential housing, wherein the first tube and the second tube are concentric with the electric drive axle relative to a central axis. In a first example of the system, the first tube is physically coupled to a first mount, a first reinforcement ring, a first wheel hub assembly, and a first brake housing, and wherein the second tube is physically coupled to a second mount, a second reinforcement ring, a second wheel hub assembly, and a second brake housing. In a second example of the system, optionally including the first example, the system further comprises: a first motor axle portion extending from the first planetary gear set to a first wheel rotor, the first motor axle portion being concentric with the first tube about a central axis. In a third example of the system, optionally including one or both of the first and second examples, the system further comprises: a second motor axle portion extending from the second planetary gear set to a second wheel rotor, the second motor axle portion being concentric with the second tube about the central axis. In a fourth example of the system, optionally including one or more or each of the first through third examples, the first motor axle portion and the second motor axle portion are linked directly to the first and second planetary gear sets and extend through a concentric axle arranged in the electric motor. In a fifth example of the system, optionally including one or more or each of the first through fourth examples, the differential housing is die cast. In a sixth example of the system, optionally including one or more or each of the first through fifth examples, the first portion of the differential housing is larger than the second portion of the differential housing. In a seventh example of the system, optionally including one or more or each of the first through sixth examples, the first portion and the second portion of the differential housing are separated by the electric motor and do not touch. In a eighth example of the system, optionally including one or more or each of the first through seventh examples, the first tube and the second tube are fixed and do not rotate.

The disclosure also provides support for a system including a differential housing comprising a first portion arranged on a first side of an electric motor and a second portion arranged on a second side of the electric motor, a first planetary gear set arranged in the first portion and a second planetary gear set arranged in the second portion, a first tube pressed into the first portion of the differential housing and physically coupled to a first mount, a first reinforcement ring, a first wheel hub assembly, and a first brake housing, and a second tube pressed into the second portion of the differential housing and physically coupled to a second mount, a second reinforcement ring, a second wheel hub assembly, and a second brake housing, wherein the first tube and the second tube are concentric with the electric drive axle relative to a central axis and, and wherein the second tube is physically coupled to a second mount, a second reinforcement ring, a second wheel hub assembly, and a second brake housing. In a first example of the system, the system further comprises: a first motor axle portion extending from the first planetary gear set to a first wheel rotor, the first motor axle portion being concentric with the first tube about a central axis. In a second example of the system, optionally including the first example, the system further comprises: a second motor axle portion extending from the second planetary gear set to a second wheel rotor, the second motor axle portion being concentric with the second tube about the central axis. In a third example of the system, optionally including one or both of the first and second examples, the first motor axle portion and the second motor axle portion are linked directly to the first and second planetary gear sets and extend through a concentric axle arranged in the electric motor. In a fourth example of the system, optionally including one or more or each of the first through third examples, the first tube and the second tube are different in length.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a first tube pressed into a first portion of a differential housing on a first side of an electric motor, wherein a mount, a first reinforcement ring, a wheel hub assembly, and a brake housing are physically coupled to the first tube, and wherein the first reinforcement ring is physically coupled to the first portion via a plurality of fasteners; and
   a second tube pressed into a second portion of the differential housing on a second side of the electric motor, the second side opposite the first side, wherein a second reinforcement ring is physically coupled to the second tube;
   wherein a first drive axle portion extends through the first tube and a second drive axle portion extends through the second tube, and wherein the second drive axle portion is different than the first drive axle portion; and
   wherein the first drive axle portion is coupled to a concentric axle adjacent to a first planetary gear set arranged in the first portion of the differential housing, and wherein the first reinforcement ring and the second reinforcement ring comprise respective dampeners.

2. The system of claim 1, wherein the second drive axle portion is coupled to the concentric axle adjacent to a second planetary gear set arranged in the second portion of the differential housing.

3. The system of claim 2, wherein the electric motor is centrally located between a first wheel hub assembly and a second wheel hub assembly and coupled to the differential housing.

4. The system of claim 1, wherein the first tube and the second tube are different in length.

5. The system of claim 1, wherein an electric drive axle comprising the first drive axle portion and the second drive axle portion is concentric with the first tube and the second tube about a central axis.

6. A system for an electric drive axle, comprising:
   a differential housing comprising a first portion arranged on a first side of an electric motor and a second portion arranged on a second side of the electric motor, the second side opposite the first side;
   a first planetary gear set arranged in the first portion and a second planetary gear set arranged in the second portion;
   a first tube pressed into the first portion of the differential housing and supported by a first reinforcement ring physically coupled to the first portion, wherein the first reinforcement ring comprises a first section distal to the first portion of the differential housing having a first diameter and a second section proximal to the first portion of the differential housing having a second diameter, the second diameter equal to a diameter of the first portion of the differential housing and larger than the first diameter; and
   a second tube pressed into the second portion of the differential housing and supported by a second reinforcement ring physically coupled to the first portion;
   wherein the first tube and the second tube are concentric with the electric drive axle relative to a central axis and comprise a first drive axle portion extending through the first tube and coupled to a concentric axle at the first planetary gear set, and wherein a second drive axle portion extends through the second tube and is coupled to the concentric axle at the second planetary gear set.

7. The system of claim 6, wherein the first tube is physically coupled to a first mount, a first reinforcement ring, a first wheel hub assembly, and a first brake housing, and wherein the second tube is physically coupled to a second mount, a second reinforcement ring, a second wheel hub assembly, and a second brake housing.

8. The system of claim 6, wherein the first drive axle portion extends from the first planetary gear set to a first wheel rotor, the first drive axle portion being concentric with the first tube about the central axis.

9. The system of claim 8, where the second drive axle portion extends from the second planetary gear set to a second wheel rotor, the second drive axle portion being concentric with the second tube about the central axis.

10. The system of claim 9, wherein the first drive axle portion and the second drive axle portion are linked directly to the first and second planetary gear sets and coupled to a concentric axle arranged in the electric motor.

11. The system of claim 6, wherein the differential housing is die cast.

12. The system of claim 6, wherein the first portion of the differential housing is larger than the second portion of the differential housing.

13. The system of claim 6, wherein the first portion and the second portion of the differential housing are separated by the electric motor and do not touch.

14. The system of claim 6, wherein the first tube and the second tube are fixed and do not rotate, and wherein the first tube and the second tube comprise mounts configured to physically couple to an underside of a vehicle.

15. A system, comprising:
a differential housing comprising a first portion arranged on a first side of an electric motor and a second portion arranged on a second side of the electric motor;
a first planetary gear set arranged in the first portion and a second planetary gear set arranged in the second portion;
a first tube pressed into the first portion of the differential housing and physically coupled to a first mount, a first reinforcement ring, a first wheel hub assembly, and a first brake housing, wherein the first reinforcement ring comprises a first section having a first diameter and a second section having a second diameter, the second diameter larger than the first diameter, wherein the second section of the first reinforcement ring is physically coupled to the first portion via a plurality of fasteners, and wherein the first section of the first reinforcement ring includes a bracket and a dampener; and
a second tube pressed into the second portion of the differential housing and physically coupled to a second mount, a second reinforcement ring, a second wheel hub assembly, and a second brake housing, wherein the second reinforcement ring is physically coupled to the second portion via a bracket;
wherein the first tube and the second tube are concentric with the electric drive axle relative to a central axis and comprise a first drive axle portion extending through the first tube and coupled to a concentric axle at the first planetary gear set, and wherein a second drive axle portion extends through the second tube and is coupled to the concentric axle at the second planetary gear set.

16. The system of claim 15, wherein the first drive axle portion extends from the first planetary gear set to the first wheel hub assembly, the first drive axle portion being concentric with the first tube about the central axis.

17. The system of claim 16, wherein the second drive axle portion extends from the second planetary gear set to the second wheel hub assembly, the second drive axle portion being concentric with the second tube about the central axis.

18. The system of claim 17, wherein the first drive axle portion and the second drive axle portion are linked directly to the first and second planetary gear sets.

19. The system of claim 15, wherein the first tube and the second tube are different in length.

* * * * *